United States Patent [19]

Basford et al.

[11] 4,343,176

[45] Aug. 10, 1982

[54] LONG-LIFE LEAK STANDARD ASSEMBLY

[75] Inventors: James A. Basford; John E. Mathis; Harlan C. Wright, all of Oak Ridge, Tenn.

[73] Assignee: The United States of America as represented by the United States Department of Energy, Washington, D.C.

[21] Appl. No.: 206,222

[22] Filed: Nov. 12, 1980

[51] Int. Cl.³ .................. G01N 1/00; G12B 13/00
[52] U.S. Cl. ........................................ 73/1 G
[58] Field of Search ................. 73/1 G, 1 R, 40

[56] References Cited

U.S. PATENT DOCUMENTS

| | | | |
|---|---|---|---|
| 2,981,091 | 4/1961 | Roberts | 73/1 G |
| 3,209,579 | 10/1965 | Roberts | 73/1 G |
| 3,290,920 | 12/1966 | Novak | 73/1 G |
| 3,516,278 | 6/1970 | Klein et al. | 73/1 G |
| 3,614,855 | 10/1971 | Van Luik, Jr. | 73/1 G X |
| 3,760,773 | 9/1973 | Christensen | 73/1 G X |
| 3,776,023 | 12/1973 | Budd et al. | 73/1 G |
| 4,142,860 | 3/1979 | Mayeaux | 73/1 G X |
| 4,164,861 | 8/1979 | Schlereth et al. | 73/1 G |
| 4,172,378 | 10/1979 | Limp | 73/1 G |

FOREIGN PATENT DOCUMENTS 124790  9/1979  Japan ........................ 73/1 G

Primary Examiner—Stuart S. Levy
Assistant Examiner—Joseph W. Roskos
Attorney, Agent, or Firm—Earl L. Larcher; Stephen D. Hamel; Richard G. Besha

[57] ABSTRACT

The present invention is directed to a portable leak standard assembly which is capable of providing a stream of high-purity reference gas at a virtually constant flow rate over an extensive period of time. The leak assembly comprises a high pressure reservoir coupled to a metal leak valve through a valve-controlled conduit. A reproducible leak valve useful in this assembly is provided by a metal tube crimped with a selected pressure loading for forming an orifice in the tube with this orifice being of a sufficient size to provide the selected flow rate. The leak valve assembly is formed of metal so that it can be "baked-out" in a vacuum furnace to rid the reservoir and attendent components of volatile impurities which reduce the efficiency of the leak standard.

5 Claims, 4 Drawing Figures

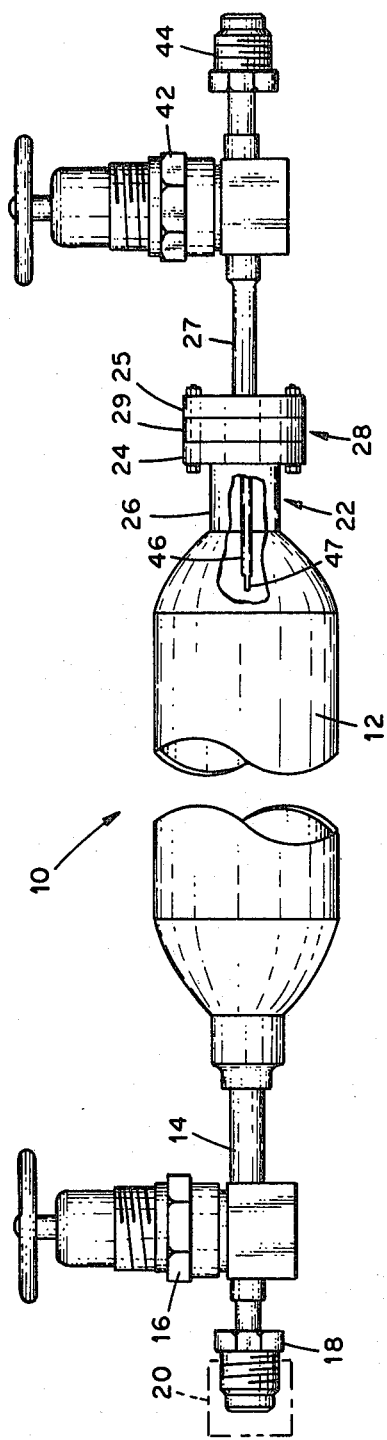

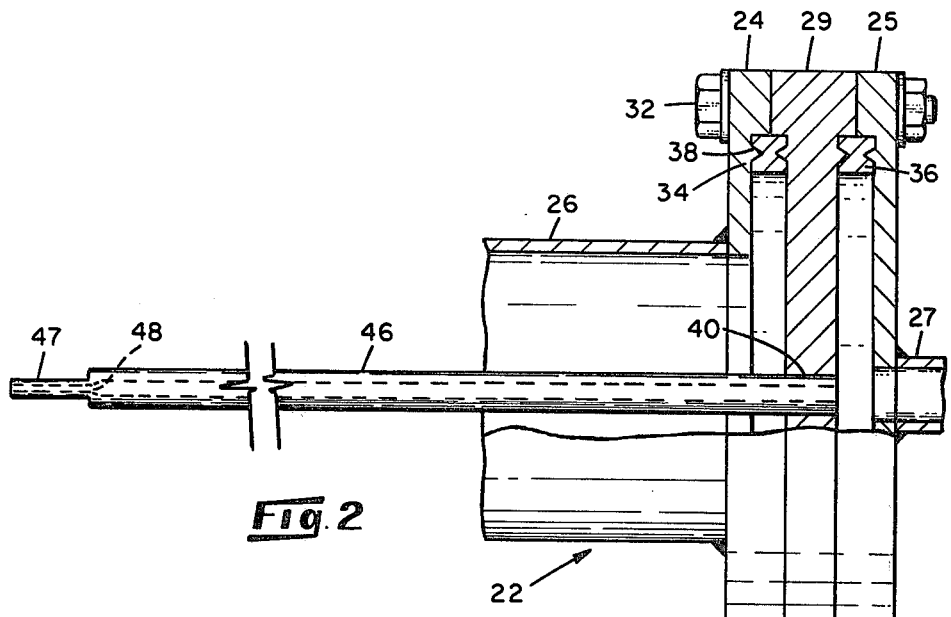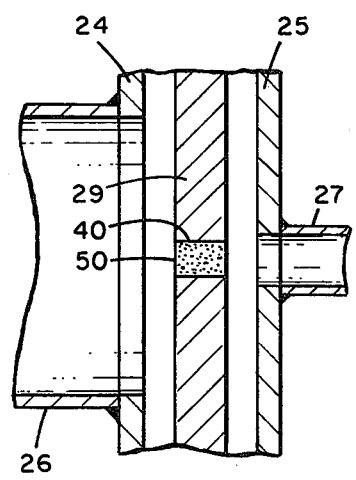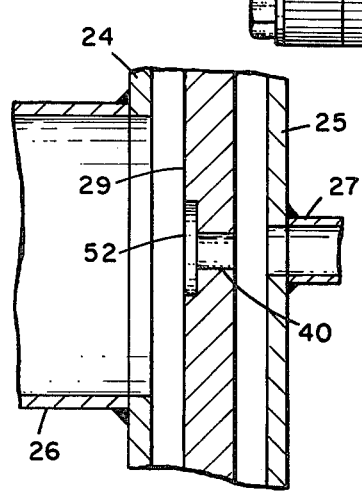

LONG-LIFE LEAK STANDARD ASSEMBLY

The present invention is a result of a contract with the U.S. Department of Energy.

BACKGROUND OF THE INVENTION

The present invention relates generally to a leak standard assembly and, more particularly, to a portable leak standard capable of delivering high-purity fluid at a precise leak rate over an extended period of time.

Leak standards have been used for calibration of precision instruments such as leak detectors, mass spectrometers, off-gassing monitors, vacuum gauges, and various flow-type gauges. For example, in a leak detector in which helium is used in conjunction with a mass spectrometer for detecting leaks in a vacuum system, the mass spectrometer is adjusted to collect only helium ions to detect leaks in the vacuum system as small as $1 \times 10^{-9}$ atm-cm$^3$/sec. To calibrate the detector for measuring such leakage, a leak standard capable of emitting a precise quantity of helium is utilized.

The leak standards heretofore used for the calibration of various instruments such as mentioned above primarily utilized a leak standard in which a glass capillary provided the leak valve for metering the specified quantity of gas. In the fabrication of such leak standards a section of a glass tube is heated and then drawn to provide a minute orifice through the drawn section. While leak standards utilizing such capillary tubes have been fairly successful, there are several shortcomings which detract from their overall desirability. It has been found to require the exercise of considerable skill to provide such capillary leaks from glass tubes due to the problems attendant with drawing the glass to form an orifice of a specified size. Also, the glass leak valves are susceptible to breakage during routine handling of the leak standard assembly. Other shortcomings with the leak standards utilizing glass capillaries are due to the incapabilities of utilizing relatively high-pressure, long-life reservoirs and of operation in environments at elevated temperatures. Further, with attendant temperature restrictions the reservoirs and other components of assembled leak standards employing glass capillaries cannot be properly cleansed of volatile impurities, such as water and nitrogen. In a conventional glass capillary leak standard a total impurity content of at least about 50,000 ppm is present so as to considerably detract from the efficiency of the standard when calibrating various instruments. The useful lifetime of the conventional leak standards is for about a period of two months since the safe reservoir capacity of these assemblies is at a pressure of only about two atmospheres absolute. Due to this relatively small reservoir capacity, the leak standards need to be refilled and recalibrated about every two months which results in a considerable expense in terms of man hours and dollars.

SUMMARY OF THE INVENTION

It is the primary aim or objective of the present invention to provide a portable leak standard assembly capable of providing a specified flow of high-purity gas at a virtually constant rate over a period of time considerably greater than the leak standards of the readily portable-type heretofore utilized. The leak standard for providing this stream of gas at a preselected and virtually uniform flow rate comprises a reservoir for containing the gas under pressure. The reservoir is provided with a sufficient volume therein to retain an adequate quantity of gas at a sufficiently high pressure to maintain a virtually uniform leak rate over a relatively extensive period of time. A first conduit means is in registry with the reservoir for conveying the high-purity gas into the reservoir and is provided with a first valve means for selectively closing or opening the conduit. A second conduit means is also in registry with said reservoir at a location thereon spaced from said first conduit means and is provided with a flange means at a location thereon spaced from the reservoir, a metal discoidal body having a passageway therethrough is affixed to the flange means and prevents the flow of gas from said reservoir through the second conduit means except through this passageway. A metal gas-flow restricting means is operatively associated with this passageway to provide a flow of gas from the reservoir through the passageway at a preselected flow rate. A second valve means is in said second conduit means for selectively interrupting or establishing the flow of gas at the preselected flow rate through the passageway. The gas-flow restricting means or leak valve is capable of withstanding the high pressures in the reservoir for providing the operation of the leak standard over a relatively extensive period of time.

The valves, reservoir, conduits and the flow-restricting means are formed of metal so that the impurities in the assembled system may be cleansed of volatile impurities prior to filling it with the gas utilized in the calibration of the instruments. This removal of the impurities assures a high-purity flow of gas for effecting instrument calibration with a greater degree of accuracy than heretofore available with portable leak standards. The removal of impurities from the system may be readily achieved by heating the assembly in a vacuum furnace so as to volatilize the impurities therein.

The leak standard of the present invention is readily portable and does not suffer the shortcomings due to impurities in the gas and the breakage of the glass capillary as heretofore encountered while providing a virtually constant flow of high-purity gas over a period of time significantly longer than heretofore attainable.

Other and further objects of the invention will be obvious upon an understanding of the illustrative embodiment about to be described or will be indicated in the appended claims, and various advantages not referred to herein will occur to one skilled in the art upon employment of the invention in practice.

DESCRIPTION OF THE DRAWINGS

FIG. 1 is an elevational view, partly broken away, showing the leak standard assembly of the present invention;

FIG. 2 is a partially sectional view of a leak valve which is particularly suitable for use in the present invention for providing a specified flow rate over an extensive period of time;

FIG. 3 is a variation of a leak valve usable in the present invention and comprises a sintered mass of metal disposed in a passageway to provide the selected flow rate; and FIG. 4 is a further variation of a leak valve in which a metal disc selectively permeable to the gas utilized in the leak standard is appropriately positioned to provide the prescribed flow rate.

Preferred embodiments of the invention have been chosen for the purpose of illustration and description. The preferred embodiments illustrated are not intended to be exhaustive or to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

DETAILED DESCRIPTION OF THE INVENTION

With reference to the accompanying drawings, the leak standard assembly of the present invention is generally shown at 10. This assembly includes a reference gas reservoir or container 12 which is shown in a cylindrical configuration but can be spherical or any other desired shape. The internal volume of the reservoir 12 is of sufficient dimensions and strength so as to retain a volume of highpressure gas to provide adequate gas for establishing a leak at an essentially constant rate over an extended period. A satisfactory size for reservoir 12 is one which has a volume in the range of about 50 to 1000 cm$^3$ and is of a material capable of retaining gas at pressures up to about 1500 psi. With a reservoir having a volume and pressure in the aforementioned ranges, leak rates normally used with standard leaks can be maintained virtually consant over extended periods of time.

The reservoir 12 is provided with a fill conduit 14 attached to one end of the cylinder by welding or the like. A valve 16 is disposed in the conduit 14 for controlling the flow of gas from a suitable source (not shown) through a threaded coupling 18 into the reservoir. This valve 18 may be of any suitable construction and material capable of withstanding the high pressures contained within the reservoir as well as elevated temperatures up to about 200° C. The valve is preferably formed of a metal such as brass or stainless steel and utilizes a bellows or gate for closing or opening the passageway through the conduit 14. Upon completion of the filling of the cylinder a cap 20 is placed on the threaded coupling 18 for protecting the threads as well as providing an additional seal for preventing the escape of gas from the reservoir 12 in the event of leakage through or the accidental opening of the valve 16.

At the opposite end of the reservoir is disposed a segmented conduit 22 which is provided with contiguous flanges 24 and 25 on the first and second sections 26 and 27, respectively, of the segmented conduit for fixedly supporting the leak valve generally shown at 28. As best shown in FIG. 2 this leak valve 28 is provided with a discoidal body 29 of a diameter corresponding to that of the flanges 24 and 25 and which is bolted between these flanges by bolts 32. In order to assure that this coupling between the flanges and the leak valve 28 is gas-tight, suitable seals, as generally shown at 36, may be disposed between the flanges 24 and 25 and the discoidal body 29. While any conventional seal capable of preventing leakage and withstanding elevated temperatures up to about 50° to 150° C. may be utilized, a satisfactory seal arrangement is through the use of annular copper seals 36 disposed between knife-like projections 38 on the discoidal body 29 and the flanges 24 and 25. These projections 38 bear into the copper seals 36 upon tightening the bolts 32 so as to provide a fluid-tight seal. The leak valve has a centrally located throughgoing aperture or passageway 40 in which the calibrated leak is disposed or operatively associated as will be described in detail below.

The segmented conduit 22 is also provided with a valve 42 which may be similarly constructed to valve 16 and which is positioned on the conduit at a location downstream of the leak valve 28 so as to selectively interrupt or establish the flow of the gas from the reservoir 12 at a preselected flow rate through the calibrated leak in the leak valve 28 to a point of use. A threaded coupling 44 is disposed at the distal end of the conduit 22 for securing the leak assembly 10 to an appropriate coupling on the instrument to be calibrated.

The entire leak standard assembly is preferably formed of metal so as to withstand the heat utilized in the impurity-removing vacuum baking operation described below and to withstand the high pressure utilized within the reservoir 12. Except for the seals 34 and possibly some of the components of valves 16 and 42 and the material utilized to form the leak valve 28, the entire assembly may be made of a stainless steel such as 304 L or any other metal having required strength and heat resistance characteristics.

Leak valve 28 as shown in detail in FIG. 2 comprises an elongated tube 46 of a length in the range of about 0.25 to 5 inches attached to the discoidal body 30 in registry with the apperture 40. This attachment may be achieved by welding or by any other suitable joining mechanism, e.g., pressed fit. The calibrated leak is achieved by crimping the distal end 47 of the tube 46 for providing an orifice 48 which restricts flow of gas through the tube to a flow rate as low as about $2 \times 10^{-9}$ atm-cm$^3$/sec. Satisfactory metallic materials which can be utilized for the construction of the tube 46 include stainless steel such as 304 L or 316, Inconel, Monel, and nickel. The wall thickness of the tube 46 is a critical parameter in the formation of the leak valve in that the walls should have sufficient thickness to prevent closure of the tube while allowing for controlled reduction in the diameter of the passageway through the tube. For example, leak rates in the range of about $1 \times 10^{-5}$ to $2 \times 10^{-9}$ atm-cm$^3$/sec have been achieved by crimping a stainless steel tube of type 316 which has an inside diameter in the range of 0.005 to 0.020 inch and an outside diameter in the range of 0.0625 to 0.125 inch and in a suitable vice at a pressure in the range of about 2600-3200 psi. By utilizing this crimped tube leak satisfactory reproducibility of the leak is readily achieved in that the leak rate through several tubes is reproducible within about ±5%.

While the leak valve 28 is preferably formed as that shown in FIG. 2 other leak valves as shown in FIGS. 3 and 4 may be utilized in the leak standard assembly of the present invention. As shown in FIG. 3, the passageway or aperture 40 through the discoidal body is filled with sintered metal plug 50 having sufficient open porosity to provide the desired leak rate. This sintered metal leak is provided by filling aperture 40 with powdered stainless steel or other powdered metal, applying a pressure of up to 2000 psi, and, finally, sintering under a one atmosphere pressure of hydrogen at temperatures up to 1000° C. This porous plug can also be formed by plasma spraying of a suitable powdered metal or other material onto a support substrate attached to discoidal body 29. As shown in FIG. 4, a metal plug or cap 52 is disposed over the passageway 40. This plug 52 is fabricated from a metal or other suitable material which is selectively permeable to the gas in the reservoir. For example, the plug may be formed of palladium or glass when hydrogen or helium, respectively, is in the reservoir 12. The leak rate through this plug 52 can be readily controlled by the varying thickness and density of the plug.

In a typical preparation of the assembled leak standard for receiving a reference gas of a selected type, the valves 16 and 42 are opened and the assembly 10 is connected to a vacuum system through threaded couplings 18 and 44. The pressure is reduced to about $1 \times 10^{-5}$ torr and the vacuum system and assembly 10 are heated to a temperature of 200° C. for a period of about 12 hours. The vacuum system and assembly 10 are cooled to ambient temperature, allowing the pressure to fall to about $1 \times 10^{-8}$ torr. The vacuum pump is then valved off and the baked assembly is then connected, by opening a valve, with a pressurized cylinder of high-purity reference gas and charged to the desired pressure. By baking the assembly prior to filling it with gas, an impurity content in the reference gas is significantly lower than that achieved with prior art leak standards. For example, in a leak assembly charged with helium after baking, the analysis of the gas through a spectrometer indicated a total impurity content of 4412 ppm with the impurities consisting primarily of hydrogen and water. A conventional leak standard utilizing a glass capillary with no bakeout capabilities contained impurity content of at least 50,000 ppm with these impurities primarily consisting of hydrogen, water, nitrogen and carbon dioxide.

It will be seen that the present invention provides a portable standard leak assembly which overcomes the problems due to breakage as well as providing a high-purity reference gas over a period of time significantly greater than that achievable with the prior art devices.

What is claimed is:

1. A portable leak standard for providing a stream of gas at a preselected and virtually uniform flow rate comprising:
    a reservoir for retaining said gas under pressure with said reservoir having a sufficient volume therein to retain said gas at essentially a constant pressure over a relatively extensive period for maintaining said stream of gas at said virtually uniform flow rate,
    first conduit means in registry with said reservoir for conveying said gas into the reservoir,
    first valve means in said conduit means for selectively closing or opening the latter,
    second conduit means in registry with said reservoir at a location thereon spaced from said first conduit means,
    flange means on said second conduit means at a location spaced from said reservoir,
    a metal discoidal body having a passageway therethrough affixed to said flange means for sealing said second conduit means and preventing flow of gas from said reservoir except through said passageway,
    a metal gas flow restricting means operatively associated with said passageway for providing a flow of gas from said reservoir through said passageway at said preselected flow rate, and
    second valve means in said second conduit means for selectively interrupting or establishing the flow of gas at said preselected flow rate through said passageway.

2. A leak standard as claimed in claim 1, wherein said metal gas flow restricting means comprises an elongated tube in registry with said passageway and supported by said discoidal body, and wherein the end of the tube remote to said passageway is provided with an orifice in registry with said reservoir and said passageway and of a size sufficient to provide said preselected flow rate.

3. A leak standard as claimed in claim 2, wherein the orifice in said tube provides a leak rate in the range of $1 \times 10^{-5}$ to $2 \times 10^{-9}$ atm-cm$^3$/sec, and wherein a leak rate in said range is provided by the selective crimping of the tube overlying said orifice.

4. A leak standard assembly as claimed in claim 1, wherein said metal gas flow restricting means comprises a sintered metal plug disposed in said passageway with said plug having sufficient permeability to provide said preselected flow rate.

5. A leak standard assembly as claimed in claim 1, wherein said metal gas flow restricting means comprises a metal plug disposed in said passageway with said plug being of a metal permeable to the gas in said reservoir.

* * * * *